US006863345B2

(12) United States Patent
Kain

(10) Patent No.: US 6,863,345 B2
(45) Date of Patent: Mar. 8, 2005

(54) VEHICLE ANCHOR SYSTEM FOR JUVENILE SEAT BASE

(75) Inventor: James M. Kain, Troy, OH (US)

(73) Assignee: Cosco Management, Inc., Wilmington, DE (US)

(*) Notice: Subject to any disclaimer, the term of this patent is extended or adjusted under 35 U.S.C. 154(b) by 108 days.

(21) Appl. No.: 10/074,798

(22) Filed: Feb. 13, 2002

(65) Prior Publication Data

US 2003/0151286 A1 Aug. 14, 2003

(51) Int. Cl.[7] .................................................. A47C 1/08

(52) U.S. Cl. ............................. 297/256.16; 297/250.1; 297/485

(58) Field of Search ......................... 297/250.1, 256.13, 297/256.14, 256.16, 253, 485, 468, 182; 248/503.1

(56) References Cited

U.S. PATENT DOCUMENTS 3,388,947 A * 6/1968 Rosen
3,404,917 A * 10/1968 Smith
3,912,328 A * 10/1975 Tanaka ....................... 297/389
4,345,791 A * 8/1982 Bryans et al. ........... 297/250.1
4,521,052 A * 6/1985 Cone ............................. 297/3
4,634,177 A * 1/1987 Meeker ................... 297/250.1
4,685,741 A * 8/1987 Tsuge et al. ................ 297/467
4,762,364 A * 8/1988 Young ..................... 297/250.1
5,110,182 A * 5/1992 Beauvais ............. 297/250.1 X
5,115,523 A 5/1992 Cone
5,378,046 A * 1/1995 Gordy et al. ............... 297/485
5,383,708 A * 1/1995 Nagasaka et al. ........ 297/250.1
5,479,892 A * 1/1996 Edwards ..................... 119/771
5,538,322 A 7/1996 Cone et al.
5,567,007 A 10/1996 Czernakowski et al.
5,581,234 A * 12/1996 Emery et al. ........ 297/250.1 X
5,611,596 A * 3/1997 Barley et al. .......... 297/256.13
5,671,971 A 9/1997 Koyanagi et al.
5,890,762 A 4/1999 Yoshida
6,000,753 A 12/1999 Cone, II
6,024,408 A 2/2000 Bello et al.
6,030,047 A 2/2000 Kain
6,193,310 B1 2/2001 Batalaris et al.
6,428,099 B1 * 8/2002 Kain ....................... 297/256.1
6,554,358 B2 * 4/2003 Kain ..................... 297/256.13
6,588,365 B2 * 7/2003 Best Wright ............... 119/28.5
6,592,183 B2 7/2003 Kain
6,705,676 B1 * 3/2004 Berringer et al. ...... 297/256.16
2003/0193226 A1 * 10/2003 Kain .......................... 297/253

* cited by examiner

*Primary Examiner*—Peter R. Brown
*Assistant Examiner*—Stephen Vu
(74) *Attorney, Agent, or Firm*—Barnes & Thornburg LLP

(57) ABSTRACT

A seat mount is provided for use with a vehicle seat and anchor mounts provided in or near the vehicle seat. The seat mount includes a base for placement on the vehicle seat and a vehicle anchor system adapted to be coupled to the anchor mounts. The base includes a pair of openings for receiving a portion of the vehicle anchor system. The vehicle anchor system includes an anchor belt adapted to be coupled to the anchor mounts. The anchor belt includes a strap having a central portion, opposite end portions, and a clasp coupled to each end portion and adapted to be coupled to one of the anchor mounts. The anchor belt is threaded through the openings to position the seat in a rearwardly facing anchored position on the vehicle seat. The vehicle anchor system also includes a leash coupled to the base and to the central portion of the anchor belt.

27 Claims, 4 Drawing Sheets

48
49
50
11
20
44
70
72
46
52
59
74
82
51
80
57
16
26
21
78
42
76
30
72
90
92
62
86
10
70
46
80
74
92
82
40
88
32
94
38
51
78
57
36
76
59
28

34
26
13
50
42
70
11
21
82
62
46
46
16
78
76
72
80
92
74
20
52
59
51
70
90
86
92
92
74
48
57
40
80
76
78
90
94
88
10
38
36
32
51
28
57
34
52
59

VEHICLE ANCHOR SYSTEM FOR JUVENILE SEAT BASE

BACKGROUND AND SUMMARY

The present disclosure relates to juvenile vehicle seats, and particularly to a base for use with juvenile vehicle seats. More particularly, the present disclosure relates to a system for anchoring the base in a fixed position on a vehicle seat.

Juvenile vehicle seats are used to transport young children in automobiles or other vehicles. These seats are often adapted to set on a juvenile-seat base which rests on a vehicle seat. Seats for infants are adapted to set on a vehicle seat and face in a rearward direction, while seats for older children are adapted to set on a vehicle seat and face in a forward direction. Convertible vehicle seats are adapted to be used in either rearwardly facing or forwardly facing directions. Similarly, the bases for use with the juvenile seats may be adapted to be used in the rearwardly facing direction only, the forwardly facing direction only, or in both the rearwardly and forwardly facing directions.

U.S. Pat. Nos. 6,000,753 and 5,538,322 disclose apparatus for retaining a child car seat on a vehicle seat, which patents are hereby incorporated by reference herein. See also U.S. applications Ser. Nos. 09/614,078 and 09/751,107 and U.S. Pat. No. 6,336,682, which disclosures are hereby incorporated by reference herein. Further, U.S. Pat. Nos. 6,318,799, 6,318,799, 6,139,101, 6,042,182 and 5,567,008 disclose seat bases for use with juvenile vehicle seats.

In accordance with the present disclosure, a seat mount is provided for use with a vehicle passenger seat and anchor mounts provided in or near the vehicle seat. The seat mount is adapted to couple to a juvenile seat and includes a base and a vehicle anchor system coupled to the base and adapted to be coupled to the anchor mounts. The vehicle anchor system is movable between an anchored position to anchor the base in a rearwardly facing position on the passenger seat and a stowed position within a storage compartment of the base. The vehicle anchor system includes an anchor belt adapted to be coupled to the anchor mounts and an anchor belt leash that couples the anchor belt to the base. The base further includes a pair of openings for receiving a portion of the anchor belt when the base is in use in the rearwardly facing position and the vehicle anchor system is in the anchored position.

In some illustrative embodiments, the leash is coupled to a top surface of the base. In other illustrative embodiments, the leash is coupled to a bottom surface of the base. In such embodiments, the base includes an access slot and a portion of the leash is threaded through the access slot when the vehicle anchor system is in the anchored and stowed positions.

The anchor belt includes a strap having a central portion and opposite end portions. The anchor belt further has a pair of clasps or other suitable couplers, each of which is coupled to a respective end portion of the strap and each of which is adapted to be coupled to a respective anchor mount.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
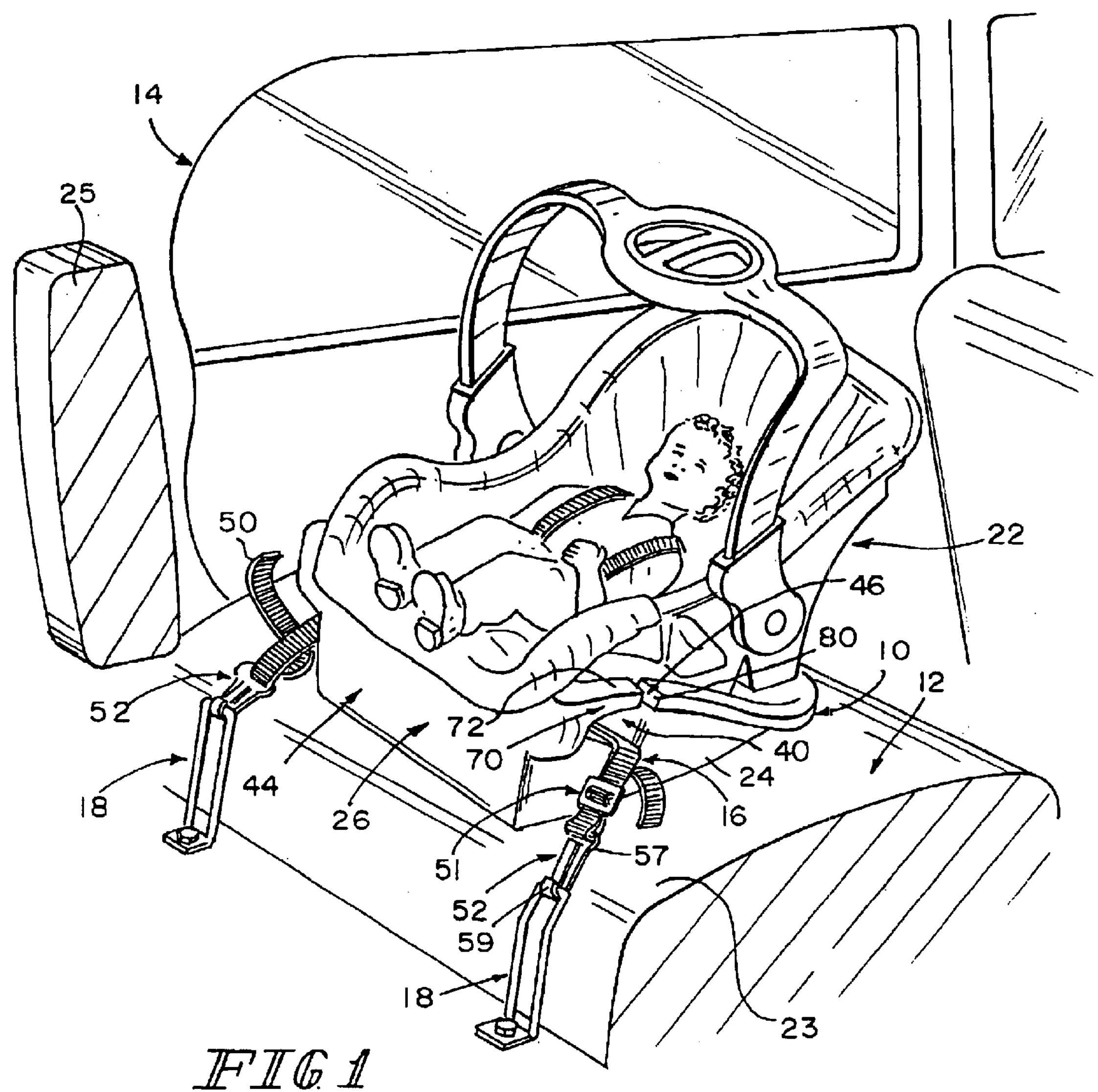
FIG. 1 is a perspective view of a juvenile seat coupled to a juvenile-seat base which is fixed in place on a rear passenger seat bottom in a vehicle by a vehicle anchor system having an anchor belt coupled at each end to one of two U-shaped metal anchor mounts bolted to the vehicle floor and arranged to extend upwardly through a space provided between the rear passenger seat bottom and back.

A seat mount 11 is provided for use with a vehicle passenger seat 12 and a juvenile seat 22, as shown in FIG. 1. Seat mount 11 includes a juvenile-seat base 10 for placement on passenger seat 12 and a vehicle anchor system 13 coupled to base 10. Vehicle anchor system 13 includes an anchor belt 16 to be coupled to a pair of anchor mounts 18 provided in or near vehicle seat 12, as shown, for example, in FIG. 1. Vehicle anchor system 13 also includes an anchor belt leash 20 coupled to base 10 and to anchor belt 16.

Figure 4:
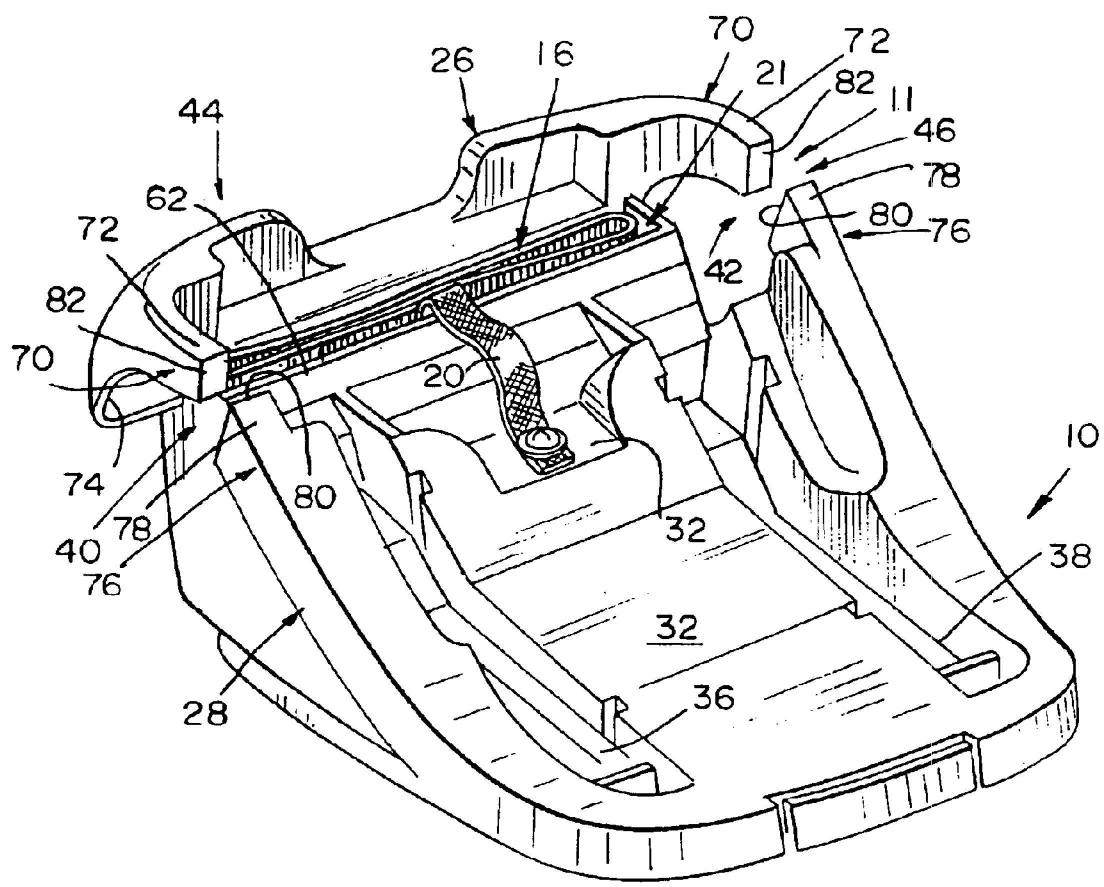
FIG. 4 is a perspective view similar to FIG. 3 showing the anchor belt stowed within a storage compartment of the base and further showing the leash remaining coupled to the base when the anchor belt is stowed within the compartment.
Figure 7:
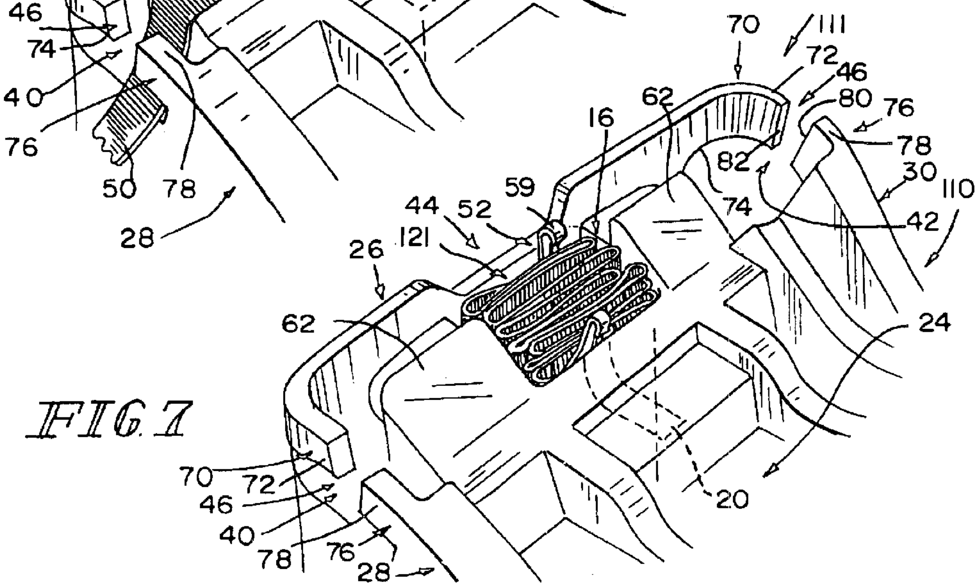
FIG. 7 is a top perspective view of the seat mount of FIGS. 5 and 6, showing the anchor belt in a stowed position within a storage compartment of the base and also showing the leash remaining coupled to the base while the anchor belt is in the stowed position.

The system 13 is movable between an anchored position, as shown in FIG. 1, in which the base 10 is anchored to passenger seat 12 in a rearwardly facing position on the passenger seat 12 and a stowed position, as shown in FIGS. 4 and 7, in which the anchor belt 16 is stored in a storage compartment 21 of the base 10. Leash 20 of vehicle anchor system 13 remains coupled to base 10 when system 13 is moved between the anchored position and the stowed position. Further, leash 20 allows anchor belt 16 to move from side to side relative to base 10 so that seat mount 11 is able to cooperate with different vehicle seats 12 having anchor mounts 18 spaced apart by different distances.

Figure 2:
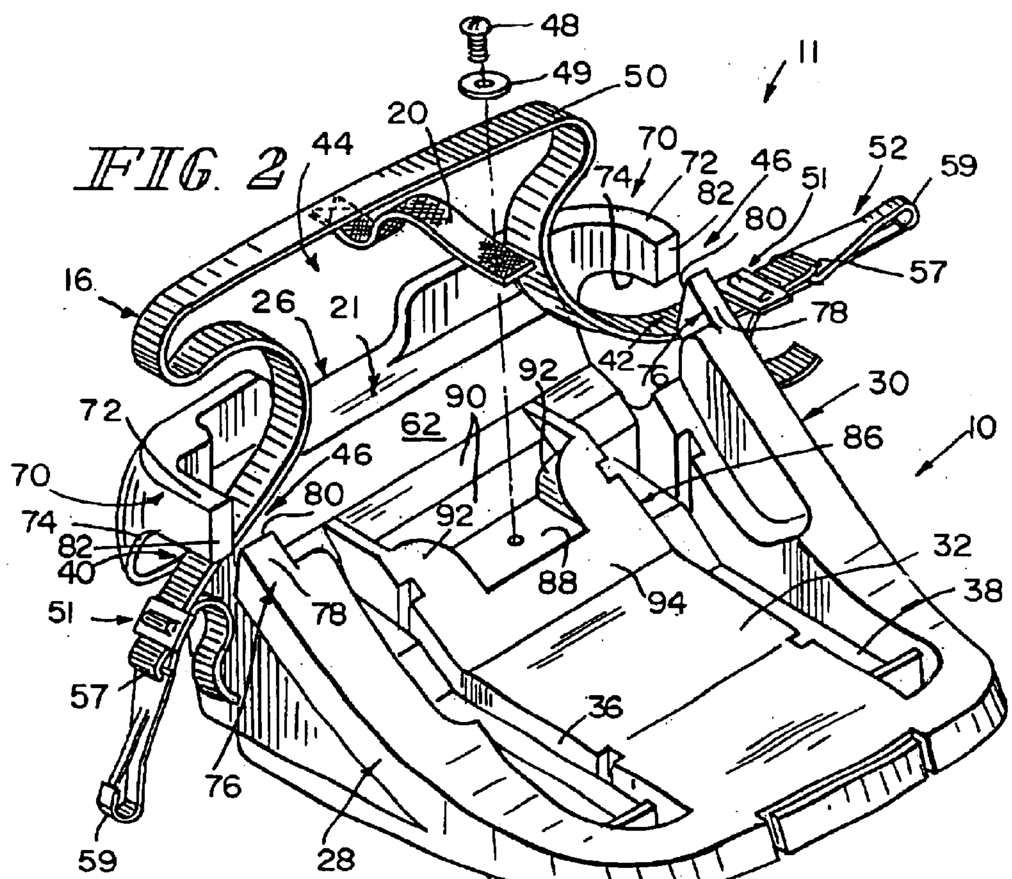
FIG. 2 is an exploded perspective view of the base and the vehicle anchor system, which cooperate to comprise a seat mount according to this disclosure, showing the anchor belt threaded through openings formed in the base and further showing an anchor belt leash of the anchor system extending from a central portion of the anchor belt and arranged to be coupled to a portion of the base by a screw.
Figure 3:
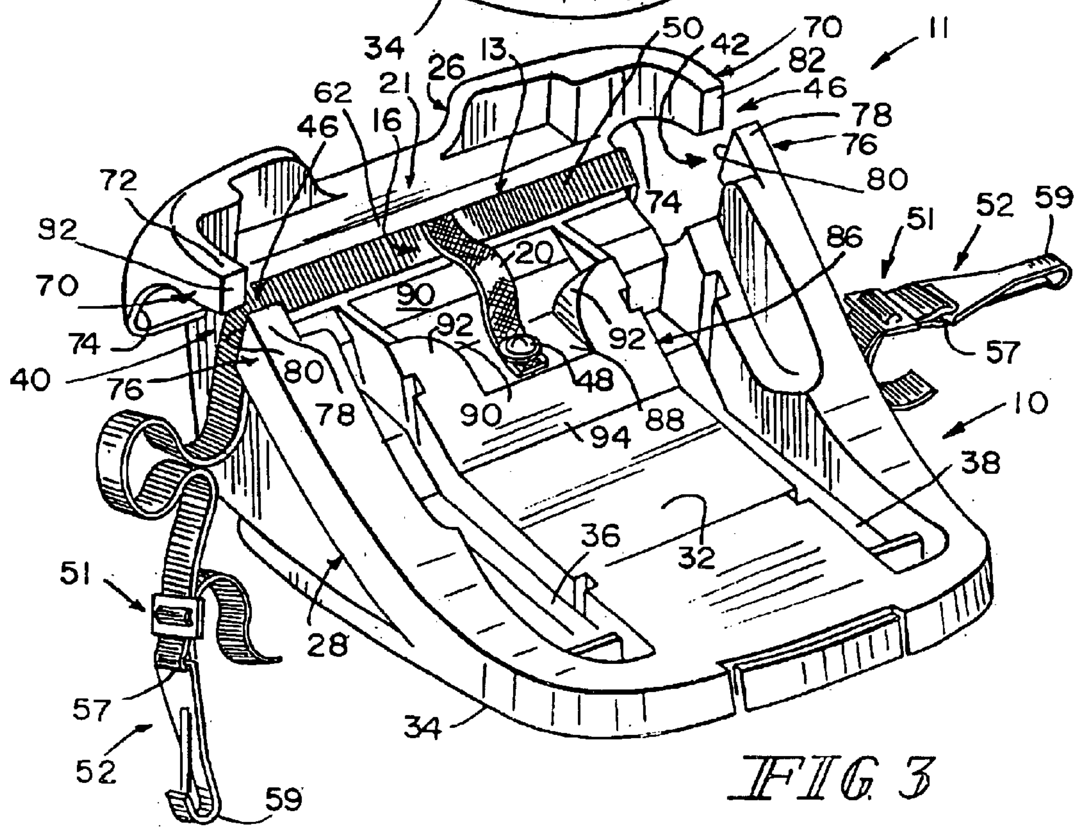
FIG. 3 is a perspective view similar to FIG. 2 showing the leash coupled to the base and showing the anchor belt positioned to lie adjacent an anchor belt surface of the base extending between the two openings which receive the anchor belt.

In one embodiment, shown in FIGS. 1–4, base 10 is held in place on seat 12 in a vehicle 14 by anchor belt 16 which is coupled to base 10 and to each of two anchor mounts 18 provided in vehicle 14. One end of leash 20 is coupled to anchor belt 16 and another end of leash 20 is coupled to base 10, as shown in FIGS. 2 and 3. Juvenile seat 22 is coupled to base 10 and is provided to seat a young child therein.

Base 10 includes a base bottom 24 and a front portion 26 coupled to bottom 24, as shown in FIGS. 2 and 3. Base 10 further includes a first side wall 28 extending upwardly from bottom 24 along one edge of front portion 26 and a second side wall 30 extending upwardly from bottom 24 along an opposite edge of front portion 26. Base bottom 24 includes a top surface 32 and a bottom surface 34. Top surface 32 engages juvenile seat 22 when seat 22 is placed on and coupled to base 10, as shown in FIG. 1. Top surface 32 includes grooves or channels 36, 38 for receiving corresponding components of seat 22. It is within the scope of this disclosure for top surface 32 of base 10 to include any type of configuration suitable for receiving a juvenile seat 22 thereon. It is further within the scope of this disclosure to provide a base made of a plastics material and formed to include a base bottom 24, a front portion 26, and side walls 28, 30 integral with each other or to provide those components separately using any suitable structure(s). It is also within the scope of this disclosure to provide a base made of a suitable material other than a plastics material. Furthermore, it is within the scope of this disclosure for other coupling elements, such as latches, posts, rods, locks, and the like, to be coupled to base 10 for providing attachment points to which seat 22 couples.

Each sidewall 28, 30 of base 10 further includes a belt-receiving opening 40, 42, respectively. Each opening 40, 42 is positioned toward a front end 44 of base 10 near front portion 26 of base 10 and is provided for receiving a portion of anchor belt 16 when anchor belt 16 is in the anchored position. Each side wall 28, 30 further includes an entryway or slot 46 to provide access to each respective opening 40, 42.

As shown in FIGS. 2 and 3, base 10 includes right and left curved arms 70 positioned at front end 44 of base 10. Each arm portion 70 has a generally horizontal top surface 72 relative to base bottom 24 and a curved bottom surface 74. Each arm 70 defines a portion of the respective opening 40, 42. Base 10 further includes corresponding right and left inclined arms 76 spaced apart from respective right and left curved arms 70. Each inclined arm 76 includes an inclined top surface 78 and an end 80. Each end 80 faces toward and is spaced apart from a respective end 82 of each curved arm 70.

Inclined arms 76 cooperate with respective curved arms 70 to form openings 40, 42. Further, end 80 of each inclined arm 76 and end 82 of each respective curved arm 70 cooperate to define each slot 46 of base 10 which provides access to respective openings 40, 42. Openings 40, 42 are sized to permit a portion of anchor belt 16 with clasps 52 to be threaded therethrough and each slot 46 provides a belt-path for sliding a portion of anchor belt 16 therethrough to position a portion of anchor belt 16 within each respective opening 40, 42. In other words, anchor belt 16 may be threaded through openings 40, 42 to prepare anchor belt 16 to be positioned in the anchored position or anchor belt 16 may alternatively be slid through the belt-path or slot 46 to prepare anchor belt 16 to be positioned in the anchored position.

Openings 40, 42 define a rearward anchor means for receiving anchor belt 16 in the anchored position to cause anchor belt 16 to be coupled to base 10 when base 10 (and juvenile seat 22 when coupled to base 10) occupies a rearwardly facing position on passenger seat 12, as shown in FIG. 1. This allows anchor belt 16 to be coupled to anchor mounts 18 to retain base 10 in a fixed position on passenger seat 12. The rearward anchor means is established by one or more belt receiving openings in or on base 10 to receive, hold, or restrain anchor belt 16 in its rearwardly facing anchored position. Further, it is within the scope of this disclosure for belt-receiving openings 40, 42 to be formed in a portion of base 18 other than side walls 28, 30

As shown, for example, in FIGS. 2 and 3, openings 40, 42 are formed to lie on either side of and above base bottom 24 near the front end 44 of base 10. Each opening 40, 42 is generally circular and is sized to permit a portion of anchor belt 16 to be passed or threaded therethrough. Slot 46, for providing access to each opening 40, 42 is also sized to permit a portion of anchor belt 16 to be passed therethrough.

Anchor mounts 18 are provided by the manufacturer of vehicle 14 or another aftermarket supplier and can take any suitable form. In the illustrated embodiment, each anchor mount 18 includes an elongated U-shaped rod and a base coupled to the rod and fixed to a floor or other part of vehicle 14. The bight portion of the U-shaped rod is arranged to extend upwardly through a space provided between a rear end of a passenger seat bench 23 of passenger seat 12 and a lower portion of a passenger seat back 25 of passenger seat 12. Anchor mounts 18 are aligned in spaced-apart relation to one another so that anchor belt 16 can be coupled to base 10 and to each anchor mount 18 when anchor belt 16 is received in its anchored position.

As mentioned above, leash 20 permits side to side movement of anchor belt 16 so that vehicle anchor system 13 can be adjusted to couple to various anchor mounts spaced apart from each other by different distances. Anchor belt 16 includes a strap 50 having opposite ends and a clasp 52 or other suitable connector on or near each end of strap 50. Each clasp 52 is configured to be coupled to one of anchor mounts 18 as shown, for example, in FIG. 1. Each clasp 52 includes a slot 57 for receiving strap 50 therethrough and a hook 59 adapted to be coupled to an associated anchor mount 18. Strap 50 is made of any suitable seat belt or harness restraint material. The anchor belt 16 further includes an adjuster 51, as shown in FIGS. 1–3. The adjuster 51 is used to adjust a length of a central portion of strap 50 positioned between clasps 52.

Leash 20 is coupled to the central portion of strap 40 at one end and to base 10 at an opposite end as shown in FIGS. 2 and 3. Specifically, leash 20 is coupled to top surface 32 of base 10 near the front end 44 of base 10. Leash 20 is coupled to base bottom 24 and positioned between each side wall 28, 30 and behind front portion 26.

Base bottom 24 includes a leash mount portion 86 and leash 20 is coupled to leash mount portion 86. Leash mount portion 86 is positioned toward front end 44 of base 10 below an anchor belt surface 62 of base 10, as shown in FIGS. 2 and 3. In the anchored position, the central portion of anchor belt 16 lies against anchor belt surface 62 of base 10, as shown in FIG. 3. Surface 62 extends between openings 40, 42 and supports anchor belt 16 in the anchored position. As shown in FIG. 2, anchor belt surface 62 lies in an inclined plane relative to base bottom 24, for example. A horizontal wall 88 of leash mount portion 86 is spaced apart from anchor belt surface 62 by wall portions 90 of leash mount portion 86. Leash 20 is coupled to horizontal wall 88, as shown in FIG. 3. Horizontal wall 88 is positioned between two sidewalls 92 of leash mount portion 86, one wall portion 90, and an inclined wall 94 also of leash mount portion 86. Horizontal wall 88 is positioned at a level below anchor belt surface 62. Leash 20 is coupled to wall 88 in this lowered position in order to provided clearance for seat 22 mounted on base 10.

Anchor belt 16 can be moved between the anchored position and the stowed position without separating anchor belt 16 from leash 20. Further, leash 20 remains coupled to base 10 when anchor belt 16 is moved between the anchored position and the stowed position.

As mentioned above, anchor belt 16 may be placed in the stowed position is used when the vehicle anchor system 13 is not needed to secure base 10 to passenger seat 12. To move anchor belt 16 to the stowed position, as shown in FIG. 4, the user unclasps each hook 59 from anchor mounts 18 to release vehicle anchor system 13 from the anchored position. Each end portion of anchor belt 16, including clasps 52, is then threaded through the respective belt-receiving opening 40, 42 so that anchor belt 16 and a portion of leash 20 can be folded for storage within storage compartment 21. As shown in FIG. 4, storage compartment 21 is located behind front portion 26 and in front of surface 62. Leash 20 remains coupled to base 10 by connector 48 when belt 16 is in compartment 21. As shown in FIGS. 2-4, illustrative connector 48 is a screw used with a washer 49. However, it is within the scope of this disclosure to include a seat mount 11 having vehicle anchor system 13 coupled to base 10 by any other suitable means, such as a bolt or a rivet, for example.

Figure 5:
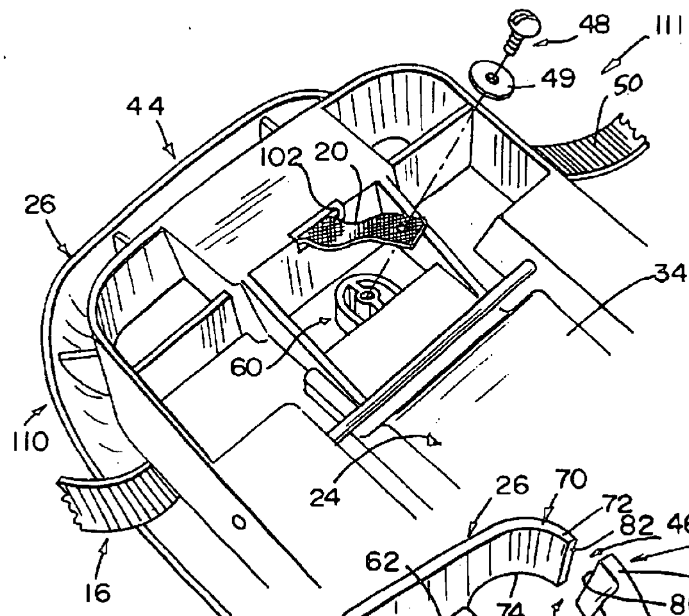
FIG. 5 is a bottom perspective view of a portion of another embodiment of a seat mount according to this disclosure showing an alternative base having an access slot and showing the leash extending through the access slot to be coupled to a bottom surface of the base.
Figure 6:
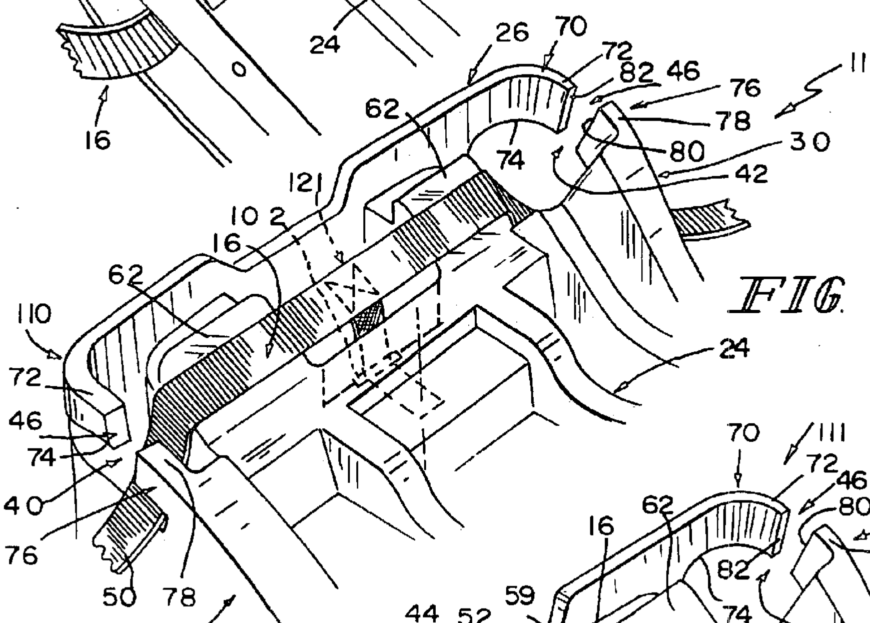
FIG. 6 is a top perspective view of a portion of the seat mount of FIG. 5 showing the anchor belt threaded through the openings of the base and also showing a portion of the leash (in phantom) coupled to the bottom surface of the base.

Referring now to FIGS. 5–7, there is shown another exemplary embodiment of a seat mount for use with a juvenile seat 22, hereinafter designated with reference numeral 111. A base 110 of seat mount 111 is somewhat similar to base 10 of seat mount 11. As such, the same reference numerals have been used in FIGS. 5–7 to designate similar components to those components previously discussed in regard to FIGS. 1–4, and additional discussion thereof is not warranted.

One difference between base 10 and base 110 is that base 110 includes an access slot 102 within base bottom 24. Access slot 102 is positioned near anchor belt surface 62 of anchor belt 16 as shown in FIG. 6. Leash 20 is coupled to bottom surface 34 of base bottom 24 and is threaded through access slot 102 to permit anchor belt 16 to be used in the anchored position received through openings 40, 42. As shown in FIG. 5, leash 20 is coupled to a mount 60 of base bottom 24 by connector or screw 48. Mount 60 is coupled to an underside of base bottom 24. Looking now to FIG. 6, vehicle anchor system 13 is in the anchored position having a portion of each end of anchor belt 16 threaded through the respective belt-receiving opening 40, 42 so that clasps 52 can be coupled to anchor mounts 18 of vehicle 14. Base 110, similar to base 10, includes anchor belt surface 62 between openings 40, 42 of base 110. Anchor belt surface 62 of base 110 however, includes a right portion and a left portion, as shown in FIGS. 6 and 7. The central portion of leash 20 lies adjacent to and engages right and left portions of surface 62 when vehicle anchor system 13 is in the anchored position.

A storage compartment 121, similar to storage compartment 21 of base 10, is provided. Storage compartment 121 is located between the right and left portions of surface 62 to form a recessed area for receiving vehicle anchor system 13 in the stowed position, as shown in FIG. 7, for example.

A vehicle anchor system 13 having an anchor belt and a leash as disclosed herein is usable with bases other than those disclosed herein. Further, such a leash can be permanently coupled to other areas or portions of the base than those shown in FIGS. 1–7. For example, the leash may be coupled to one of the side walls of the base or to the front portion or a front or back wall of the base, if desired. The leash permanently couples vehicle anchor system 13 to the base, thereby minimizing the likelihood that vehicle anchor system 13 will separate from the base and become lost. Further, although bases 10, 110 are only used for rearwardly facing juvenile seats, it is within the scope of this disclosure to include a base used for forwardly facing juvenile seats, too.

Although this invention has been described in detail with reference to certain embodiments, variations and modifications exist within the scope and spirit of the invention as described and defined in the following claims.

What is claimed is:

1. A seat mount for use with both a vehicle seat and anchor mounts provided in or near the vehicle seat, the seat mount comprising a base having sides and adapted to be coupled to a human juvenile seat, an anchor belt including a strap, opposite end portions, and a clasp coupled to each of the end portions and adapted to be coupled to one of the anchor mounts, an elongated leash coupled at one end to the base and at another end to the anchor belt between sides of the base and wherein the leash is flexible and allows the anchor belt to move.

2. The seat mount of claim 1, wherein the base further includes a pair of openings and the anchor belt is threaded through the openings to position the base in an anchored position.

3. The seat mount of claim 2, wherein the base further includes a base bottom, a front portion coupled to the base bottom, a first side wall extending upwardly from the base bottom along one edge of the front portion, and a second side wall extending upwardly from the base bottom along an opposite edge of the front portion, and wherein each of the side walls includes one of the openings.

4. The seat mount of claim 3, wherein the base further includes a slot through each of the walls side for communication with one of the respective openings.

5. The seat mount of claim 2, wherein the strap includes a central portion between each of the end portions, the base includes a base bottom and side walls coupled to the base bottom, and the leash is coupled to the central portion of the strap and to the base bottom of the base.

6. The seat mount of claim 5, wherein the base bottom includes a top surface adapted for communication with a juvenile seat and a bottom surface adapted for communication with a vehicle seat and wherein the leash is coupled to the top surface of the base bottom.

7. The seat mount of claim 5, wherein the base bottom includes a top surface adapted for communication with a juvenile seat and a bottom surface adapted for communication with a vehicle seat and wherein the leash is coupled to the bottom surface of the base bottom.

8. The seat mount of claim 7, wherein the base bottom further includes an access slot formed to receive a portion of the leash therethrough.

9. The seat mount of claim 1, further including a coupler coupling the leash to the base.

10. The seat mount of claim 9, wherein the coupler is a screw.

11. The seat mount of claim 9, wherein the coupler is a rivet.

12. The seat mount of claim 1, wherein the base further includes an anchor belt surface formed to extend between the openings of the base and wherein the anchor belt lies adjacent the surface when the anchor belt is in the anchored position.

13. The seat mount of claim 12, wherein the base bottom includes a storage compartment configured to receive the anchor belt in a stowed position when the anchor belt is not threaded through the openings, and wherein the leash remains coupled to the base bottom when the anchor belt is moved between an anchored position where the anchor belt is threaded through the openings and the stowed position where the anchor belt is received within the storage compartment.

14. The seat mount of claim 13, wherein the storage compartment is positioned adjacent the anchor belt surface.

15. The seat mount of claim 14, wherein the storage compartment is positioned between a right portion and a left portion of the anchor belt surface.

16. The seat mount of claim 1 wherein the leash is flexible and allows the anchor belt to move from side to side.

17. A seat mount is provided for use with a juvenile seat, a passenger vehicle seat, and anchor mounts provided in or near the passenger vehicle seat, the seat mount comprising a base having a base bottom, a first side wall extending upwardly from the bottom and a second side wall extending upwardly from the bottom, an opening formed in each of the side walls, and a storage compartment positioned between the side walls, a vehicle anchor system coupled to the base bottom and having at least one connector portion shaped to couple to the anchor mounts in an anchored position, the system being movable between the anchored position where a portion of the system is received through each of the openings to position the base in a rearwardly facing position on the vehicle seat and a stowed position where the system is disconnected from the anchor mounts and a portion of the system is received within the storage compartment, the vehicle anchor system, including the portion of the system received through each of the openings, remaining coupled to the base during movement between the anchored position and the stowed position.

18. The seat mount of claim 17, wherein the vehicle anchor system includes an anchor belt and a leash coupled to the base at one end and coupled to the anchor belt at another end, the anchor belt being threaded through the openings of the base to position the system in the anchored position.

19. The seat mount of claim 18, wherein the anchor belt includes a strap having a central portion and opposite end portions and a clasp coupled to each end of the portions and adapted to be coupled to one of the anchor mounts.

20. The seat mount of claim 19, wherein the leash is coupled to the central portion of the strap.

21. The seat mount of claim 18, wherein the leash is coupled to a top surface of the base bottom.

22. The seat mount o claim 21, wherein the base includes an anchor belt surface positioned to extend between the openings of the base for placement of the anchor belt thereon when the system is in the anchored position, and further wherein the storage compartment is formed in the front portion of the base and is positioned adjacent the anchor belt surface.

23. The seat mount of claim 17, wherein the leash is coupled to a bottom surface of the base.

24. The seat mount of claim 23, wherein the base includes an access slot and a portion of the leash is received through the access slot when the vehicle anchor system is in the anchored position and the stowed position.

25. The seat mount of claim 23, wherein the base includes a right anchor belt surface and a left anchor belt surface each positioned between the openings of the base for placement of the anchor belt thereon when the system is in the anchored position, and further wherein the storage compartment is positioned between the right and the left anchor belt surfaces.

26. A seat mount is provided for use with both a vehicle seat and anchor mounts provided in or near the vehicle seat, the seat mount comprising a base having a pair of openings, an anchor belt having connectors for coupling to the anchor mounts, the anchor belt being threaded through the openings to position the seat in an anchored position, and a flexible leash having an end coupled to the base and another end fixedly coupled to a portion of the anchor belt inside the base, the flexible leash enabling the anchor belt to move laterally through the openings relative to the base so that the anchor belt is adapted to be coupled to anchor mounts spaced apart by different distances.

27. A seat mount for use with both a vehicle seat and anchor mounts provided in or near the vehicle seat, the seat mount comprising a base having a first surface shaped to abut a vehicle seat and a second surface having human juvenile seat coupling elements for mounting a human juvenile seat to the base, an anchor belt including a strap, opposite end portions, and a clasp coupled to each end portion and adapted to be coupled to one of the anchor mounts, and a substantially planar leash with one side abuttingly coupled to the base and the same side abuttingly coupled to the anchor belt.

* * * * *